United States Patent [19]

Hanagan et al.

[11] Patent Number: 4,817,583

[45] Date of Patent: Apr. 4, 1989

[54] INSECT GUARD FOR A GAS APPLIANCE

[75] Inventors: Joseph J. Hanagan, Freeport; Doyle Raymer, Davis, both of Ill.

[73] Assignee: King-Seeley Thermos Co., Prospect Heights, Ill.

[21] Appl. No.: 166,197

[22] Filed: Mar. 10, 1988

Related U.S. Application Data

[62] Division of Ser. No. 943,122, Dec. 17, 1986, Pat. No. 4,747,391.

[51] Int. Cl.⁴ .............................................. F24C 3/00
[52] U.S. Cl. .............................. 126/41 R; 126/39 K; 43/107; 431/354
[58] Field of Search ................ 126/38, 39 E, 41 R, 126/39 R, 25 R, 39 K, 39 J; 431/354, 355, 356, 346; 48/180.1; 43/109, 107, 121

[56] References Cited

U.S. PATENT DOCUMENTS

| | | | |
|---|---|---|---|
| 460,429 | 9/1891 | Conrad | 43/109 |
| 479,980 | 8/1892 | Gordon | 43/109 |
| 713,449 | 11/1902 | Keiser | 431/346 |
| 1,507,731 | 9/1924 | Gregorie | 43/109 |
| 1,576,784 | 3/1926 | Planett | 43/109 |
| 2,233,832 | 3/1941 | Byrd | 43/109 |
| 2,531,139 | 11/1950 | Lilly et al. | 431/346 |
| 3,269,299 | 8/1966 | Nielsen | 126/41 R |
| 3,714,733 | 2/1973 | Madonna | 43/121 |
| 3,959,620 | 5/1976 | Stephen, Jr. | 126/41 R |
| 4,020,561 | 5/1977 | Mathews | 34/174 |
| 4,267,816 | 5/1981 | Koziol | 126/41 R |
| 4,373,505 | 2/1983 | Koziol | 126/41 R |
| 4,381,758 | 5/1983 | Svekis et al. | 126/41 R |
| 4,478,205 | 10/1984 | Koziol | 126/41 R |
| 4,485,799 | 12/1984 | Perez | 126/41 R |
| 4,561,419 | 12/1985 | Koziol | 126/41 R |

Primary Examiner—James C. Yeung
Attorney, Agent, or Firm—Harness, Dickey & Pierce

[57] ABSTRACT

An insect guard is provided for guarding against the entrance of insects into the venturi tubes of gas grills which may result in clogging of the fuel flow to the burners of a gas grill. The insect guard includes using a plurality of small openings to define the primary air opening in the venturi tube, and also providing for a close tolerance fit at the connection between the venturi tube and the outlet orifice of the valve such that insects are substantially prevented from entrance into the venturi tube.

4 Claims, 2 Drawing Sheets

4,817,583

INSECT GUARD FOR A GAS APPLIANCE

This is a division of U.S. patent application Ser. No. 943,122, filed Dec. 17, 1986, now U.S. Pat. No. 4,747,391.

TECHNICAL FIELD

The present invention relates to an insect guard for use in a gas appliance to prevent the entry by an insect into a venturi tube and subsequent blocking of a venturi tube in a gas appliance. More specifically the present invention relates to an insect guard for the primary air openings in the venturi tube of a gas appliance and subsequent connections to valve outlets at the venturi end of the venturi tube.

BACKGROUND OF THE INVENTION

The use of outdoor gas appliances such as gas grills and gas barbecues has become prevalent today. However, because of the use of these appliances and their storage in an outdoor location, the appliances are subject to the elements, which includes allowing insect life access to their internal components.

For instance, insects such as spiders, wasps, bees, grasshoppers, and arachnids have been known to enter the venturi tubes and other fuel feed lines of gas burners and clog these lines thus interrupting fuel flow to the burners which may cause improper operation or malfunctioning of the unit. In addition, insects which enter the venturi tube may die inside the tube and their bodies may disrupt or constrict the flow of gas to the burner which is undesirable for proper operation of these grills.

Past gas grill manufacturers have attempted to remedy this problem by recommending periodic cleaning of the venturi tube and providing tools to perform this task. In addition manufacturers of gas grills have cautioned users about this type of problem and recommended periodic inspections of the venturi tube and primary air opening.

SUMMARY OF THE INVENTION

According to the present invention, there is provided an insect guard for a venturi opening in a gas burner apparatus comprising a venturi tube having a primary air opening means and an insect guard means for protection of the primary air opening means from entrance by an insect.

It is an object of the present invention to provide an apparatus to guard gas flow tubes of a gas barbecue apparatus from entrance and subsequent clogging by insects such as spiders, wasps, arachnids and other insects found in outdoor environments.

It is a further object of the present invention to provide a restriction in the size of openings defining the primary air opening such that any one opening will not allow the transgression of an insect through the opening.

A still further object of the present invention is to provide a close fit between the venturi tube and the valve outlet so that an insect cannot enter at this location either.

It is a further object of the present invention to restrict individual opening sizes of the primary opening to guard against entrance by a spider which would weave a web inside the venturi tube while still providing adequate fuel/air mixing to provide efficient and effective operation of the gas burners in the gas barbecue apparatus.

DESCRIPTION OF THE DRAWINGS

Other advantages of the present invention will be readily appreciated as the same becomes better understood by reference to the following detailed description and considered in connection with the accompanying drawings wherein.

DESCRIPTION OF THE INVENTION

An insect guard for a venturi opening in a gas burner apparatus 8 is generally shown at 10.

Figure 1:
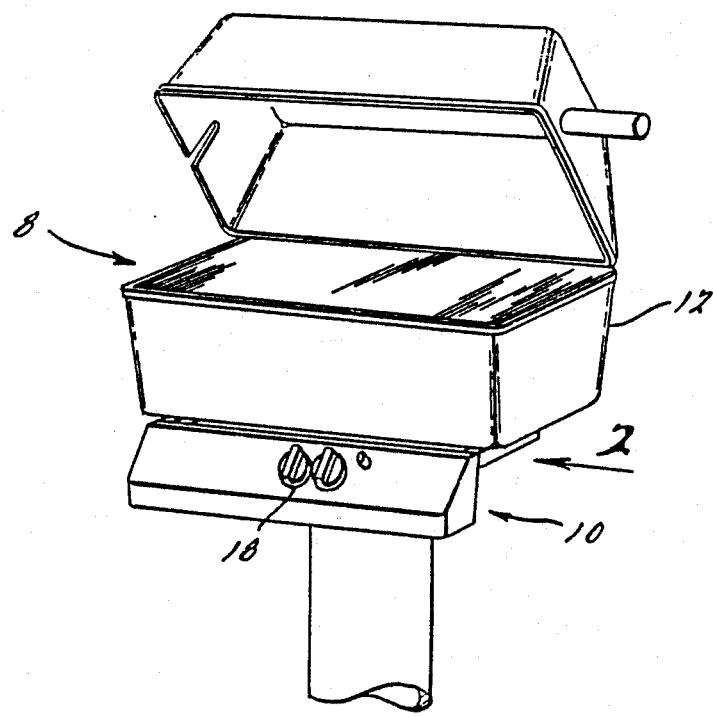
FIG. 1 is a perspective view of a gas grill apparatus utilizing the present invention.
Figure 2:
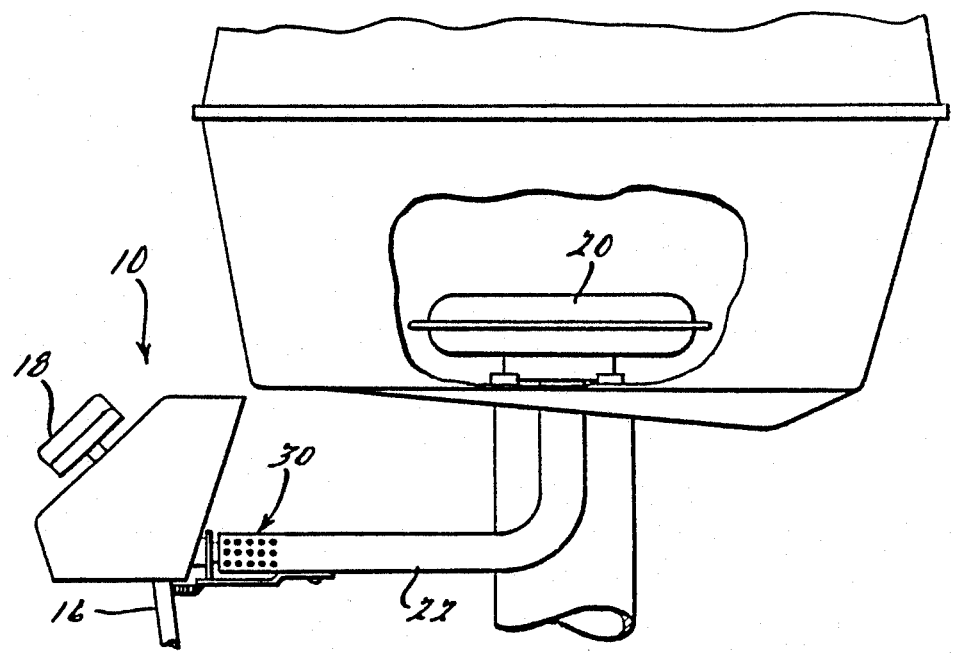
FIG. 2 is a plan view of the present invention as used in the gas burner apparatus.
Figure 3:
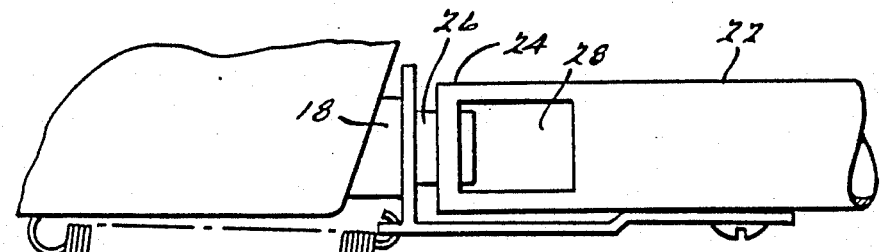
FIG. 3 is a detailed plan view of a conventional venturi tube with a conventional primary air opening.

In general, as shown in FIGS. 1 and 2 gas grills produced today include a gas grill body portion 12 which has a fuel supply and a supply line 16 which leads to control valves 18 which are for controlling the gas allowed to pass to the burners 20. The connection between the control valve 18 and the burner 20 is a venturi tube 22. The venturi tube 22 has a venturi end 24 which connects to an orifice outlet 26 from the control valve 18. At the venturi end 24 of venturi tube 22 a primary air opening 28 is provided and allows for the fuel to mix with air or oxygen to provide a combustible fuel to be ignited at the burner 20.

In general, gas grills are provided with wheels or they may be permanently mounted to a fixture in an outdoor location such as the backyard of a homeowner. Due to the outdoor use and storage of gas grills, in garages and backyards, insects have been found to enter venturi tube 22 through primary air opening 28 and at the connection at venturi end 24 and thereby crawl into the tube and spin webs or nests or otherwise clog venturi tube 22. These entrances by insects may constrict or block the flow of combustible mixture from the supply line 16 through venturi tube 22 to burner 20. This may cause inoperation of the burner or may cause a flashback problem at primary air opening 28 due to fuel which is escaping through primary air opening 28 because of constriction of venturi tube 22.

Figure 5:
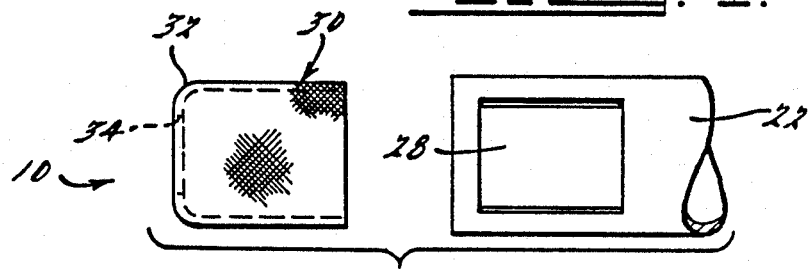
FIG. 5 is exploded view of an alternative embodiment of the present invention.

The insect guard 10 of the present invention protects the venturi opening 28 in a gas burner apparatus 12 having a venturi tube 22 and primary air opening means 28. The insect guard means generally indicated at 30 protects primary air opening means from entrance by an insect. As shown in FIG. 5 insect guard means 30 of the present invention further comprises a screen 32 which is operatively positioned for blocking the primary air opening means 28 from entrance of the insect while allowing air into venturi tube 28 to allow proper operation of the burner 20.

In a preferred embodiment of the invention the screen 32 is cylindrical in configuration and has an outlet engaging opening 34 which securely engages orifice outlet 26 in a gap free arrangement which will not allow an insect to pass through the connection between the venturi end 24 of venturi tube 22 with orifice outlet 26.

Figure 4:
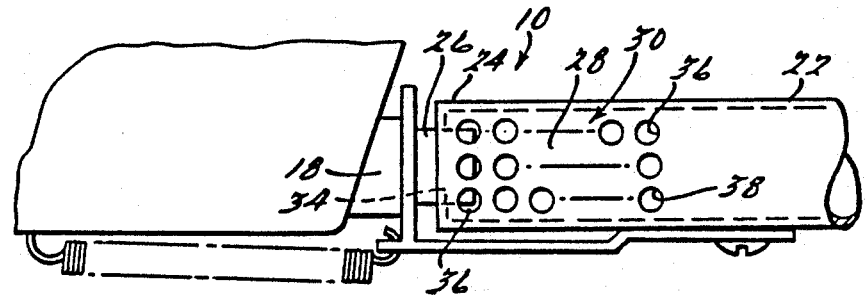
FIG. 4 is a detailed plan view of the present invention.
Figure 7:
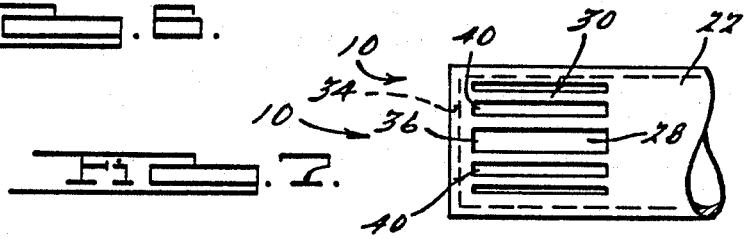
FIG. 7 is a detailed view of an alternative embodiment of the present invention.

In an alternate embodiment of the present invention, the insect guard means 30 is integrally formed in venturi tube 22 and defines the primary air opening means 28 as shown in FIG. 4. The insect guard means 30 of this embodiment further comprises perforations 36 in the venturi tube 22 which defines a primary air opening means 28. The perforations 36 of this embodiment may include a series of generally cylindrical holes 38 with a small diameter which will not allow the transgression of insects through these holes 38 or may be a series or plurality of slots 40 as shown in FIG. 7 in the venturi tube 22 at the venturi end 24 for inhibiting the entrance of insects into the venturi tube. It is believed that the optimum size for these openings is one which would restrict entrance of insects having a body size in excess of 1 cm in body diameter. Therefore in the preferred embodiment of the invention the openings found whether they be in the form of a screen or perforations preferably are approximately 1 cm or less.

In addition, the connection between the venturi end of the venturi tube 22 and the orifice outlet 26 must be of a close tolerance fit such that there is the absence of a gap between the internal surface of the venturi end 24 and the external surface of the orifice outlet 24 which would allow an insect to enter at this location.

Figure 6:
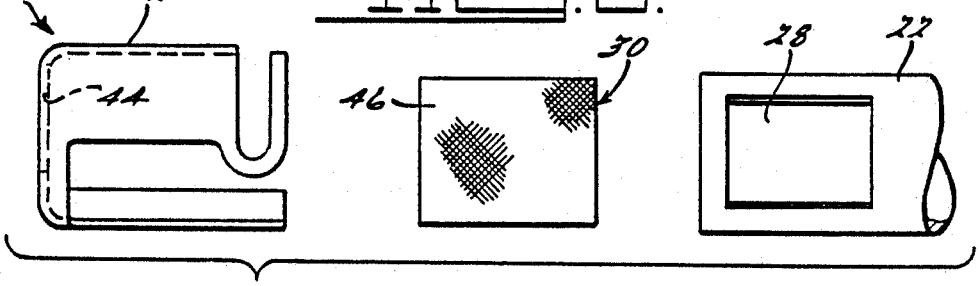
FIG. 6 is exploded view of an alternative embodiment of the present invention as used in a venturi having an adjustable air shutter over the primary air opening means.

Also provided in the present invention is an insect guard means for use in a gas grill which has an air shutter for adjusting the fuel to air mixture which reaches the burner. As shows in FIG. 6 the gas grill apparatus, may include an adjustable air shutter means 42 which can be rotated to adjust the size of the primary air opening 28 and thus allowing the adjustment of the fuel to air ratio to provide optimum burning characteristics at burner 20. The air shutter means 42 is generally cylindrical and is slideable over the venturi tube 22 at the primary air opening means 28. The air shutter means 42 has an opening 44 for engaging the orifice outlet 24 in a gap free arrangement. The air shutter means 42 is capable of circumferential articulation around the venturi tube 22 and provides for the variable control of the fuel to air mixture. The air shutter means 42 is slideable over the venturi tube in a close tolerance such that no gap exists which is large enough to allow an insect through, and the opening 44 is of a close tolerance to the orifice outlet 24 so that there is no space between the opening and orifice outlet 24 which will allow an insect to enter at this location either. In a preferred embodiment of the invention, a screen 46 is provided for insertion into the venturi tube 22 at the primary air opening 28 to restrict the air opening from entrance by an insect. In alternate embodiments of the present invention, as shown in FIG. 6 the insect guard means 30 may include perforations 36 as shown in FIGS. 6 and 7 directly in the air shutter means 42 for guarding against entrance by an insect into venturi tube 22. These perforations 36 may include a plurality of cylindrical holes 38 or in the alternative may be a series of parallel slots 40 in the air shutter means 42.

Thus, in operation when the burner assembly having venturi tube 22 is inserted in the gas grill it engages the orifice outlet 24 in a gap free arrangement at venturi end 24. This engagement with the orifice outlet 26 is of a close fit such that no gap which would allow an insect to enter through this connection is present. In addition, the insect guard means of the present invention guards the primary air opening 28 from entrance by an insect, by any of the configurations disclosed above, whether in the form of a screen or perforations in the venturi tube or air shutter means. Therefore the present invention provides a configuration which will not allow insects to enter the venturi tube and thus no clogging of the venturi tube will be caused by webs or bodies of insects.

The invention has been described in an illustrative manner, in the nature of words of description rather than of limitation. Many modifications and variations of the present invention are possible in light of the above teachings. It is therefore to be understood, that within the scope of the appended claims the invention may be practiced otherwise than as a specifically described without deviating from the scope of the present invention.

What I claim is:

1. In a gas burner apparatus having a venturi tube with a primary air intake end, an insect guard for preventing the nesting of insects in the venturi tube comprising:

a generally cylindrical screen defining a plurality of apertures, each of said apertures being of a fixed size small enough to prevent passage therethrough by an insect sought to be prevented from nesting;

said primary air intake end of said venturi tube defining an air intake opening;

said cylindrical screen being disposed on said air intake end of said venturi tube to block the passage of insects sought to be prevented while permitting air intake through said intake opening;

a fuel dispensing nozzle and wherein said venturi and said cylindrical screen each have means at said primary air intake end for receiving said nozzle and wherein said insect guard further comprises means for forming a seal between said nozzle and at least one of said means for receiving said nozzle to prevent passage of an insect through said means for receiving said nozzle.

2. The insect guard of claim 1 wherein said venturi tube defines a generally cylindrical sidewall and wherein said cylindrical screen is of a size and shape to substantially conform to and contact said sidewall.

3. The insect guard of claim 1 wherein said cylindrical screen includes an opening for receiving said nozzle and wherein said opening defines a periphery which forms a seal between said nozzle and said screen to prevent passage of an insect through said opening.

4. In a gas burner apparatus having a venturi tube with a primary air intake end, an insect guard for preventing the nesting of insects in the venturi tube comprising:

an air intake opening defined in said air intake end of said venturi tube;

a shutter means adjustably positioned on said air intake end for adjustably blocking at least a portion of said air intake opening;

a screen disposed on said shutter means, said screen having a plurality of apertures each being of a fixed size small enough to prevent passage therethrough by an insect sought to be prevented from nesting;

said screen being positioned immediately adjacent said air intake opening to prevent passage of an insect through said air intake opening;

a fuel dispensing nozzle and wherein said shutter means has a means for receiving said nozzle and wherein said insect guard further comprises means for forming a seal between said nozzle and said means for receiving said nozzle to prevent passage of an insect through said means for receiving said nozzle

* * * * *